United States Patent
Walker

(10) Patent No.: US 10,674,376 B2
(45) Date of Patent: Jun. 2, 2020

(54) DISRUPTIVE FLEXIBLE GEO SATELLITE CONSTELLATION SYSTEM

(71) Applicant: LOCKHEED MARTIN CORPORATION, Bethesda, MD (US)

(72) Inventor: Johnnie Lynn Walker, Highlands Ranch, CO (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 15/881,579

(22) Filed: Jan. 26, 2018

(65) Prior Publication Data
US 2019/0239090 A1    Aug. 1, 2019

(51) Int. Cl.
*H04W 16/28* (2009.01)
*H04W 88/16* (2009.01)
*H04W 84/06* (2009.01)

(52) U.S. Cl.
CPC ............ *H04W 16/28* (2013.01); *H04W 84/06* (2013.01); *H04W 88/16* (2013.01)

(58) Field of Classification Search
CPC .................................................. H04W 16/28
See application file for complete search history.

(56) References Cited

U.S. PATENT DOCUMENTS

| | | | |
|---|---|---|---|
| 6,252,691 B1 * | 6/2001 | Porzucki | H04B 10/801 340/10.3 |
| 7,327,698 B1 * | 2/2008 | Anselmo | H04B 7/18515 370/316 |
| 2008/0318522 A1 * | 12/2008 | Nilsson | H03D 7/161 455/12.1 |
| 2013/0070666 A1 * | 3/2013 | Miller | H04B 7/212 370/326 |
| 2014/0036744 A1 * | 2/2014 | Zeng | H04L 5/00 370/297 |
| 2015/0158603 A1 * | 6/2015 | Marshack | B64G 1/1085 244/158.4 |
| 2017/0070308 A1 * | 3/2017 | Hahn, III | H03F 1/02 |
| 2017/0371040 A1 * | 12/2017 | Whitefield | G01S 19/21 |
| 2018/0034536 A1 * | 2/2018 | Trutna | H04B 7/18519 |
| 2018/0254866 A1 * | 9/2018 | Chen | H04L 5/0046 |
| 2018/0351636 A1 * | 12/2018 | Buer | H04B 7/18513 |
| 2019/0199428 A1 * | 6/2019 | Regunathan | H04B 7/18515 |

* cited by examiner

*Primary Examiner* — Kodzovi Acolatse
*Assistant Examiner* — Jay L Vogel
(74) *Attorney, Agent, or Firm* — Morgan, Lewis & Bockius LLP

(57) ABSTRACT

An apparatus for disruptive flexible geostationary orbit (GEO) satellite constellation system includes an electronic steering array (ESA) including multiple antenna elements, a number of frequency converters coupled to the ESA, and a digital control unit to provide frequency and gain control commands to the frequency converters. Each frequency converter is coupled to an antenna element of the ESA and forms an independent payload path. A payload path is configurable to support a communication beam-pair consisting of a transmit (TX) beam and a receive (RX) beam. Each frequency converter is configured to couple the TX beam to the RX beam and to adjust a channel frequency and a gain of a respective optical communication beam independently using the frequency and gain control commands.

20 Claims, 11 Drawing Sheets

DISRUPTIVE FLEXIBLE GEO SATELLITE CONSTELLATION SYSTEM

STATEMENT REGARDING FEDERALLY SPONSORED RESEARCH OR DEVELOPMENT

Not applicable

FIELD OF THE INVENTION

The present invention generally relates to space systems, and more particularly, to a disruptive flexible geostationary orbit (GEO) satellite constellation system.

BACKGROUND

Electromagnetic waves, used to carry telecommunications signals, for example, in wireless communications, require a line-of-sight and thus can be readily obstructed over long distances by the curvature of the Earth. Communications satellites can relay the signals between widely separated points around the curve of the Earth. Communications satellites use a wide range of radio and microwave frequencies. A communications satellite may relay and amplify the radio telecommunications signals via a transponder to create a communication channel between a transmitter of the satellite and a receiver at various locations on Earth. Communications satellites may be employed in a number of applications such as radio, telephone, television, internet, and military applications. There are numerous communications satellites in Earth's orbit, used by both private and government organization.

Geostationary (GEO) satellites are used by many communication service provider and operators for communication between ground terminals (e.g., ground communication stations, air vehicles, personal communication devices, and the like) through gateways and maritime terminals such as vessels, ships and boats. The communications may be in a number of frequency bands such as Ku-band. A satellite communication systems that can support a correct balance between high-level requirements such as cost, capability and reliability is desired.

SUMMARY

According to various aspects of the subject technology, methods and configurations are disclosed for providing a high performance, low cost and flexible payload geostationary (GEO) satellite system. The disclosed satellite system supports high throughput satellite services (HTS) with lower capital expenditure along with flexibility to place capacity where and when it is needed.

In one or more aspects, an apparatus for disruptive flexible geostationary orbit (GEO) satellite constellation system includes an electronic steering array (ESA) including multiple antenna elements, a number of frequency converters coupled to the ESA, and a digital control unit to provide frequency and gain control commands to the frequency converters. Each frequency converter is coupled to an antenna element of the ESA and forms an independent payload path. A payload path is configurable to support an communication beam-pair consisting of a transmit (TX) beam and a receive (RX) beam. Each frequency converter is configured to couple a TX beam to an RX beam making a beam-pair and to adjust the transmit channel frequency, the receive channel frequency and a gain of a respective communication beam pair independently using the frequency and gain control commands.

In other aspects, a method of operating a satellite node includes communicating multiple communication beams including transmitting a number of TX beams and receiving a number of RX beams using one or more ESAs of the satellite node. The method further includes adjusting, using a number of frequency converters, channel frequencies associated with the optical communication beams. Global resource management (GRM) signals may be received, by a digital control unit, from a ground node. The frequency converters may be controlled by using commands provided by the digital control unit based on the GRM signals. A beam steering and a beam shaping of the ESAs may be performed based on signals provided by the digital control unit based on the GRM signals.

In yet other aspects, a satellite system includes one or more satellite constellations to communicate with a number of ground communication cells via multiple TX and RX beams. A number of frequency converters are coupled to each satellite node of the satellite constellations. A GRM system provides GRM signals including information related to frequency and gain control commands. The frequency converters can adjust gains and channel frequencies associated with the TX and RX beams based on frequency and gain control commands.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

Figure 1:
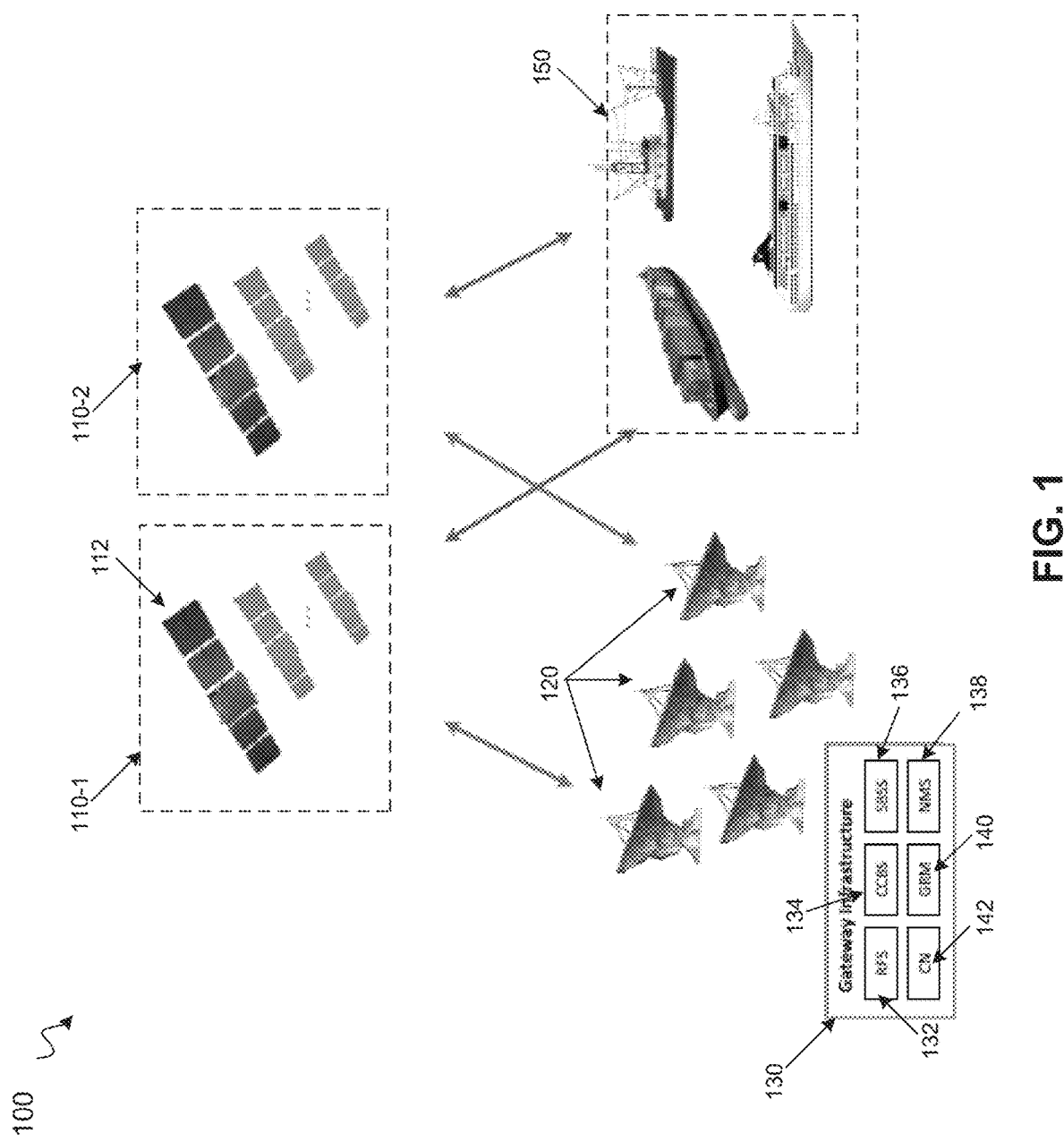
FIG. 1 is a high-level diagram conceptually illustrating an example of a flexible geostationary orbit (GEO) satellite constellation system, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to systems and configurations providing a low cost, low mass, high performance, and flexible payload geostationary (GEO) satellite system. The satellite system of the subject technology can support high throughput satellite services (HTS) with lower capital expenditure along with flexibility to place capacity where and when it is needed. The subject satellite system leverages volume and mass production for multiple launches in a single launch vehicle and a communications system architecture that consists of a flexible payload with an electronically steerable array (ESA) and a ground software to make a flexible satellite communications system. The disclosed satellite system includes a number of advantageous features such as shorter time to on-service operations, multiple satellites per lunch vehicle, payload flexibility to place capacity where it is needed, better return on investment (ROI) for satellite operators, for example, through incremental rollout of capacity by adding satellite nodes as demand increases. The system further reduces capital expenditure through low-cost flexible payload satellites and multiple satellites per launch vehicle. The flexible agile payload with ESA can form multiple transmit and receive beams anywhere over the visible Earth from the satellite node. The flexible configuration of the system allows the beam size, shape and pointing be changed on demand, and transmit (TX) and receive (RX) beams to be independently controlled. The satellite payload architecture allows connecting each TX beam to a RX beam through an agile frequency converter to form a beam-pair. Each RX to TX beam connection is independently tunable in frequency on both input and output. Further, each beam can be independently shaped and steered. Payload agility enables changing RX uplink frequency, TX downlink frequency and RX and TX beam size, shaping and pointing beams independently and quickly (agile beam hopping).

The disclosed payload architecture enables, for example, on-orbit flexibility in gateway beam and user beam assignments, on-orbit selectable mix of user-to-user beams and user to and/or from gateway beams and time hopping of gateway beams as well as user beams, so that an individual RX to TX beam connection can be configured as a user-to-user beam for a portion of time. The payload architecture may further allow user forward beam for a portion of time and a user-to-gateway return beam for another portion of time. No dedicated user or gateway beams are needed such that the system supports full flexibility in on-orbit configurability. The employed payload architecture provides the ability to place service over the full coverage area from a single gateway and to add gateways as traffic demand increases. The disclosed payload architecture provides the unique capability to mix and change the assignment of gateway and user beams, supports dedicated beam plan assignments as well as time hopped assignments. Other capabilities of the satellite payload of the subject technology include ability to increase capacity to a geographic area through using full radio-frequency (RF) payload power on a single beam, providing regional and full coverage beams as well as spot beams, beam hopping to provide connectivity to full Earth with a single satellite node and ability to operate with multiple nodes in single GEO orbital slot to deliver needed total capacity. Additional satellite nodes can be incrementally put in service to add capacity as demand arises, minimizing unused capacity and providing higher ROI. The disclosed payload allows moving satellite nodes to different orbital slots and enhances fleet management with backup satellites through the ability to reconfigure a satellite node to provide service at different orbital slots. Other advantageous features of the subject payload include providing ability to explore test markets through coverage area and orbital slot reconfigurability and using operational software consisting of satellite control software logic (SCSL) and global resource management (GRM) ground module to enable the operator to model, measure and configure the satellite system. The GRM module enables modeling and determining the beamforming coefficients, frequency plans and beam-hopping time plans. The software further can configure the satellite system to execute the plans and can measure performance of the system. The measuring elements enable the operator to identify unused capabilities of the satellite system to explore new markets and increase provided services.

The existing approaches have considered larger power and higher capacity satellites as a way to reduce the capital cost/Gbps metric. The existing approaches drive towards a satellite with 1 Tbps capacity with a large capital expenditure. Further the satellite fill rate uptake for the existing approaches is slow and may easily take the full satellite lifetime to reach 50-60% fill rate. The satellite fill rate may be expressed as a ratio of a used capacity to a potential capacity.

The disclosed system has a number of advantages over the existing solutions. Example of advantages include shorter time to on-service operations for the operator through mass and volume production of a flexible payload satellite, reduced capital cost/Gbps through low cost flexible payload satellites and multiple satellites per launch vehicle, better ROI for satellite operators due to incremental rollout of capacity by adding satellite nodes as demand increases, payload flexibility to place capacity where it is needed anywhere over the visible earth, payload architecture provides the ability to place service over the full coverage area from a single gateway and to add gateways as traffic demand increases, the payload architecture provides capability to mix and change the assignment of gateways and user beams and other capabilities listed above. Further, the subject system allows the operator to model, measure and configure the satellite system using the SCSL and GRM ground software.

FIG. 1 is a high-level diagram conceptually illustrating an example of a flexible geostationary orbit (GEO) satellite constellation system 100, according to certain aspects of the disclosure. The flexible GEO satellite constellation system 100 (hereinafter "system 100") includes groups of satellite 110 (e.g., 110-1, 110-2 . . . 110-N), gateways 120, and maritime terminals 150. In some aspects, the system 100 is not limited to maritime terminals and, and for example, includes airborne and land terminals not shown herein for simplicity. The gateways 120 may also be referred to as ground terminals. In some aspects, one or more gateways 120 may be stationed in a ground station. In some aspects, a group of satellites such as 110-1 and/or 110-2 located in a single GEO orbital slot, such as 91 degree west (91 W), may be referred to as a constellation. For example, the groups of satellites 110-1 can be a constellation or another group formed of 110-1, 110-2 . . . 110-K, for example, can be another constellation. The number of satellite nodes 112 in a satellite group 110 or a constellation may be flexible and reconfigurable based on the demand for capacity on the ground.

Each gateway 120 consists of an infrastructure 130 including a number of blocks or modules such as a radio-frequency (RF) subsystem (RFS) block 132, a customer care and billing system (CCBS) block 134, a satellite base station system (SBSS) block 136, a network management system (NMS) block 138, a ground resource management (GRM) block 140 and a core network (CN) block 142. The RFS block 132 may include, but is not limited to, RF antennas, one or more transmitter circuits and one or more receiver circuits. The CCBS block 134 is, for example, responsible for servicing and managing needs of customers (e.g., service providers and/or users) including billing aspects of the customer service. The SBSS block 136, for example, supports linking the satellite nodes to the various ground networks. The NMS block 138 is, for example, responsible for managing network connections related to the CN block 142 and other ground networks. The GRM block 140 is a crucial block of the subject technology that can manage system modeling, measuring and configuration as described in more detail herein.

Figure 2:
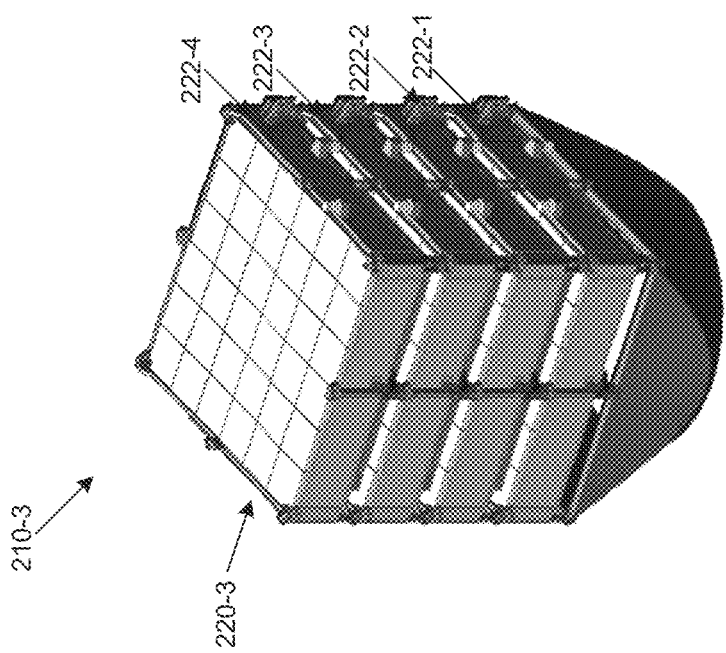
FIG. 2 is a conceptual diagram illustrating various views of an example of a launch vehicle including a number of satellite nodes, according to certain aspects of the disclosure.
Figure 2:
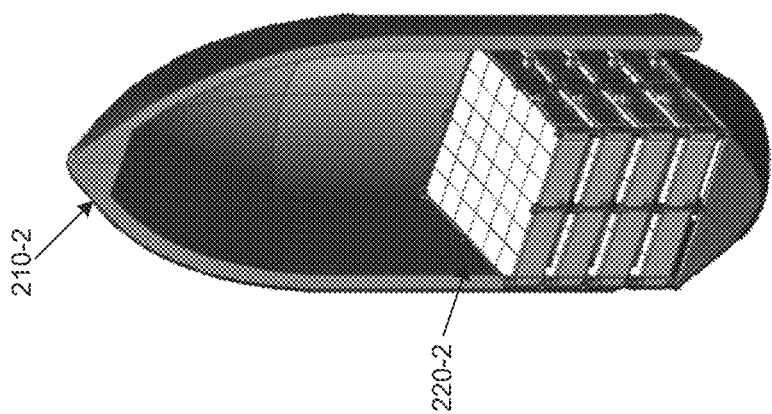
Figure 2:
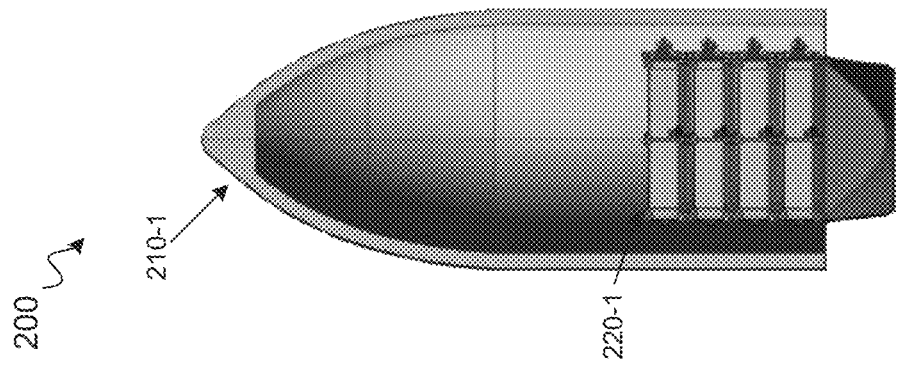

FIG. 2 is a conceptual diagram illustrating various views of an example of a launch vehicle 200 including a number of satellite nodes, according to certain aspects of the disclosure. The example lunch vehicle (e.g., spacecraft) 200 as shown in various views 210-1, 210-2 and 210-3 has a stackable configuration and can include a stack 220 (shown in various views 210-1, 220-2 and 220-3) of satellites. The stack 220 can includes a reconfigurable number of satellite nodes 222, of which only four satellite nodes (e.g., 222-1 to 222.4) are shown, but the number can be higher and is determined by a GRM system (including GRM block 140 of FIG. 1) based on demand for capacity on the ground. There are needs for low cost satellites that often have more flexible capabilities. The existing GEO satellite systems are fairly large and pretty fixed and rigid with limited or no flexibility. For example, once a large satellite is locked, it may only be filled up to a certain percentage, for example with a fill factor of about 60% or less, which means much less use of the available full capacity. The stackable configuration of the launch vehicle 200 of the subject technology allows reducing cost by having less initial number of stacked satellites with the flexibility to add more satellites later as demand grows and more users sign up for subscription. The subject technology also permits moving the capacity where the demand is by changing the configuration of different satellites based on demand. For example, beams of more satellites may be configured to cover geographic areas that are determined (e.g., by the GRM system) to need more capacity.

Figure 3:
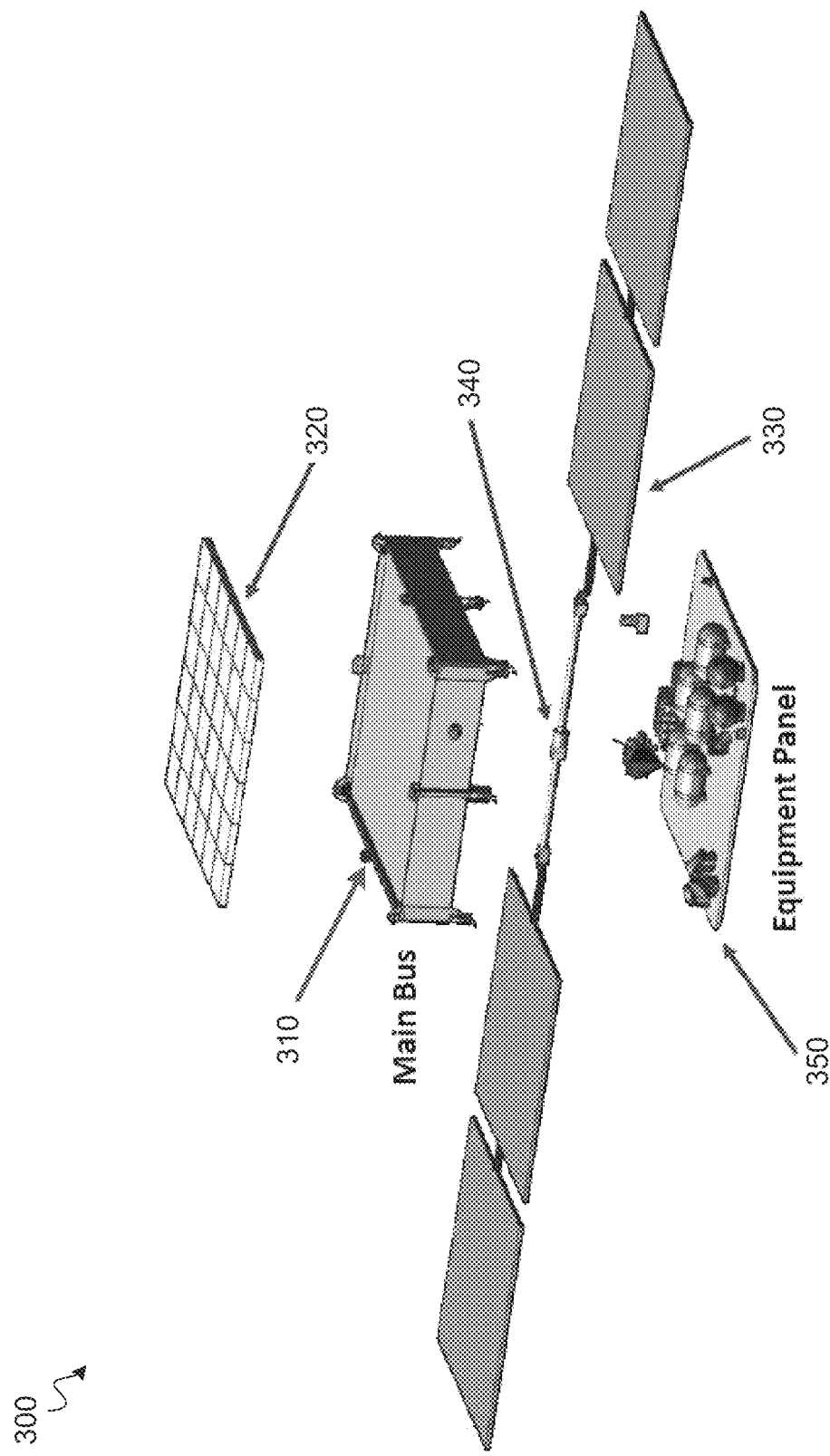
FIG. 3 is a conceptual diagram illustrating examples of various components of a satellite node, according to certain aspects of the disclosure.

FIG. 3 is a conceptual diagram illustrating examples of various components of a satellite node 300, according to certain aspects of the disclosure. The satellite node 300 can be configured for high-performance, low cost and high rate production. The satellite node 300 includes a bus 310, an electronically steerable array (ESA) 320, solar panels 330, a common solar panel drive actuator 340 and an equipment panel 350. The bus 310 is a platform that includes, for example, thruster and attitude control systems and batteries and charging systems that enable charging the batteries from the electricity provided by the solar panels 330. The bus 310 further contains the payload including communications hardware and software. The solar panels are sized based on the power requirement of the satellite node 300 and may have dimensions of, for example, about 2.5 by 2.5 meters. In some aspects, the dimensions of the solar panels 330 may be larger or smaller than 2.5 by 2.5 meters.

The equipment panel 350 may hold the bus avionics and propulsion components. The propulsion components may include, for example, electric propulsion xenon and/or Hall current thrusters (HCTs) for orbit transfer and station keeping. The avionics components may include, for example, reaction wheels, star trackers and micro-electro-mechanical system (MEMS) gyros. The ESA 320 is an Earth-pointing payload deck including an active array of antenna elements. In some aspects, the dimensions of the ESA 320 may be about 3 by 3 meters. In some aspects, the dimensions of the ESA 320 are not limited to 3 by 3 meters and may be larger or smaller. In some aspects, the satellite node 300 may have a weight within a range of about 1380 to 1860 Kg, but the weight may not be limited to these values.

Figure 4A:
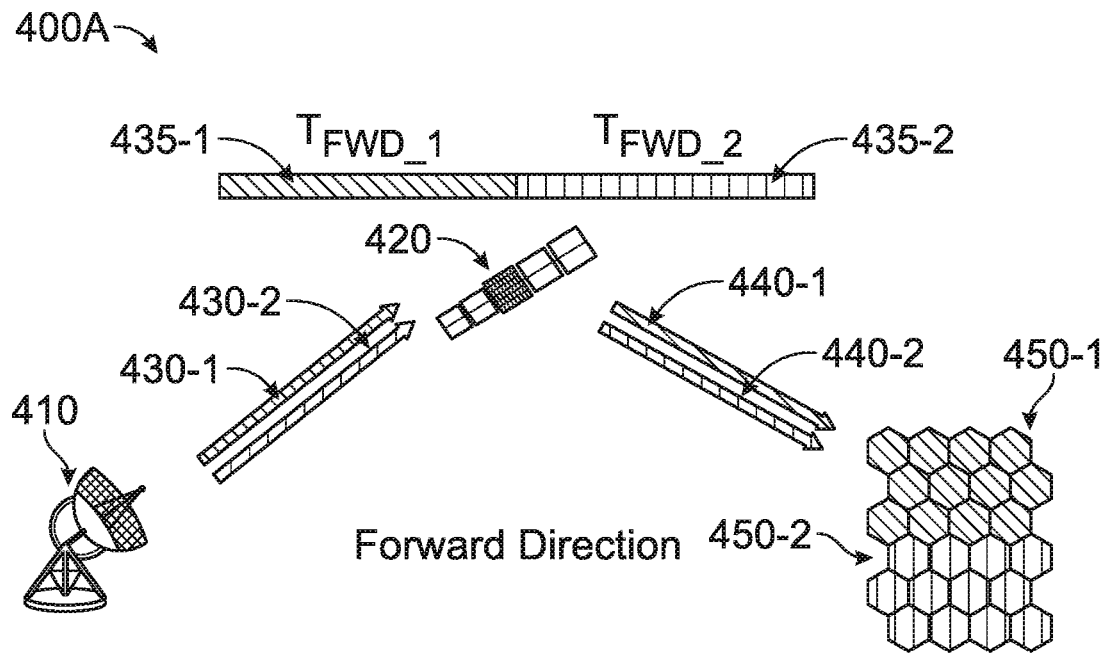
FIGS. 4A-4B are conceptual diagrams illustrating examples of a forward beam hopping scheme and a return beam hopping scheme, according to certain aspects of the disclosure.
Figure 4B:
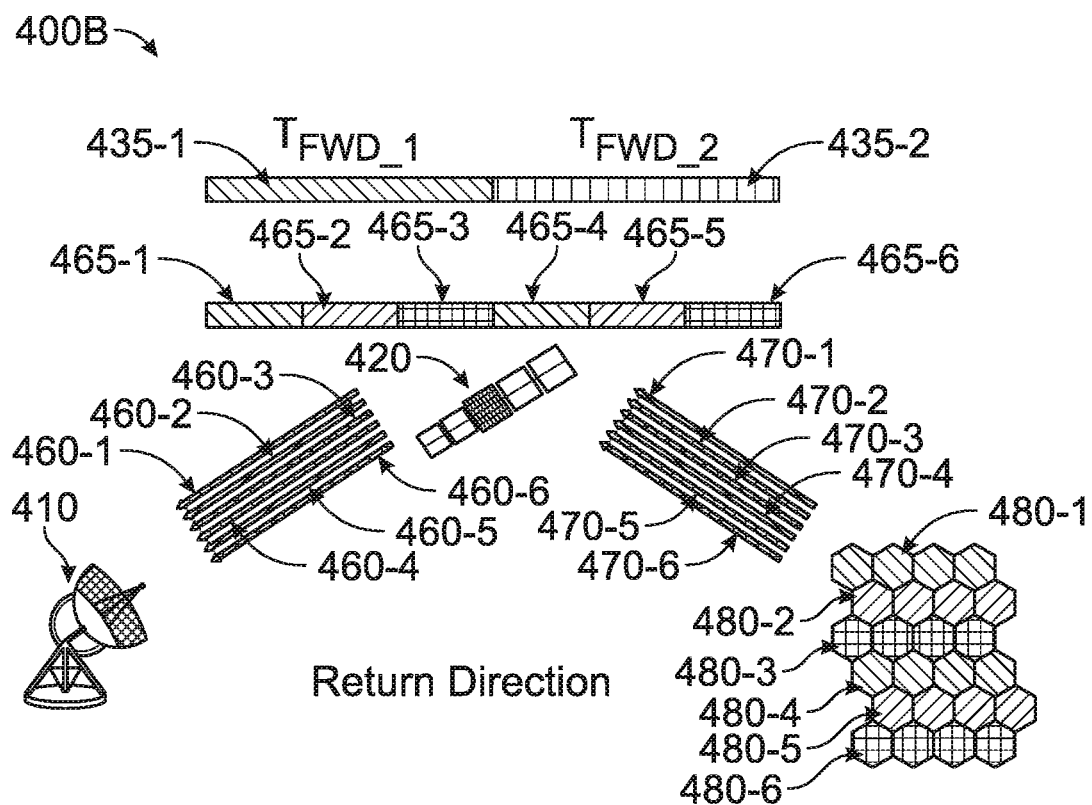

FIGS. 4A-4B are conceptual diagrams illustrating examples of a forward beam hopping scheme 400A and a return beam hopping scheme 400B, according to certain aspects of the disclosure. A satellite 420 may operate based on the forward beam hopping scheme 400A to receive a beam 430-1 in a time interval 435-1 (e.g., $T_{FWD\text{-}1}$) and a beam 430-2 in a time interval 435-2 (e.g., $T_{FWD\text{-}2}$) from a ground gateway 410. The satellite 420 may operate based on the forward beam hopping scheme 400A to cover, using an active array, cells in a coverage area 450-1 via a beam 440-1 in a time interval 435-1. The satellite 420 may operate based on the forward beam hopping scheme 400A to cover, using the active array, cells in a coverage area 450-2 via a beam 440-2 in a time interval 435-2. The forward beam hopping scheme 400A allows providing service to a larger coverage area and further supports bandwidth and power flexibility. The coverage areas 450-1 and 450-2 may include, but are not limited to, 24 cells (e.g., beam areas), which in the example forward beam hopping scheme 400A, can be covered by only a 12 beam service link provided by beams 440-1 and 440-2. by dwelling over each cell for ½ of the forward time. In other aspects, the number of beams and the dwell time are configurable, for example, based on commands from the GRM system (e.g., including the GRM block 140 of FIG. 1).

In another aspect, the satellite 420 may operate based on the return beam hopping scheme 400B to receive beams 470-1 through 470-6 in respective time intervals 465-1 through 465-6 from cells in coverage areas 480-1 through 480-6. The satellite 420 may operate based on the return beam hopping scheme 400B to transmit beams 460-1 through 460-6 in respective time intervals 465-1 through 465-6 to the ground gateway 410. The return beam hopping scheme 400B allows providing service to 24 cells of the 6 coverage areas 480-1 to 480-6 using a 4-beam feeder link of each of the beams 470-1 through 470-6. The return beam hopping scheme 400B further supports bandwidth and power flexibility. The coverage areas 480-1 through 480-6 may include, but are not limited to, 24 cells (e.g., beam areas), which in the example return beam hopping scheme 400B, are covered by only 6 beams each dwelling over each cell for ⅙ of the total return time. In another aspect, the number of beams and the dwell time are configurable, for example, based on commands from the GRM.

Figure 5:
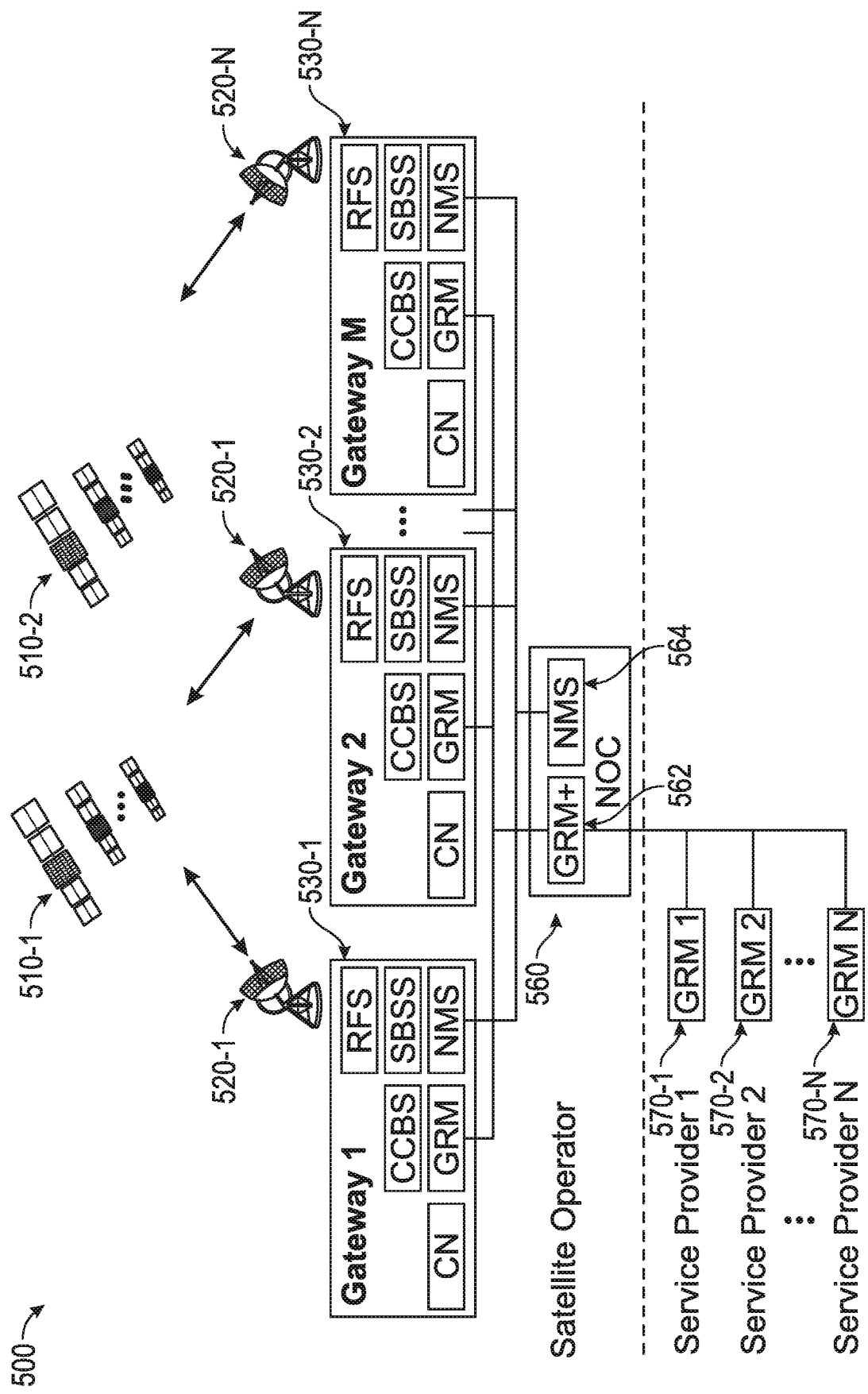
FIG. 5 is a conceptual diagram illustrating an example of a flexible GEO satellite constellation system, according to certain aspects of the disclosure.

FIG. 5 is a conceptual diagram illustrating an example of a flexible GEO satellite constellation system 500, according to certain aspects of the disclosure. The GEO satellite constellation system 500 includes satellite groups 510 (e.g., 510-1, 510-2, etc.), gateways 520 (e.g., 520-1 through 520-N), satellite operator system 560 and service provider GRM modules 570 (e.g., 570-1 through 570-N). The satellite groups 510 and the gateways 520 are similar to the satellite groups 110 and the gateways 120 of FIG. 1 and their descriptions are avoided here for brevity. The gateways 520 includes infrastructures 530 (e.g., 530-1 through 530-N) that are similar to the infrastructure 130 of FIG. 1 described above.

The operator system 560 includes, among other modules, a GRM system 562 and a NSM module 564. The operator system 560 may be used by a satellite operator that operates groups of satellites 510 (e.g., one or more GEO constellations) and the gateway 520 to support a number of (N) service providers. The service provider GRM modules 570 are supported by the GRM system 562. In general, the GRM system 562 can provide capability to model, measure and configure the existing satellite constellation and new spacecraft additions. For example, the modeling aspects of the GRM system 562 can be used to size the payload components for launch from the modular building blocks, and full capabilities of the GRM system 562 can be used by the operator over the lifetime of the system. In some aspects, the GRM system 562 interfaces with a number of elements of the GEO satellite constellation system 500 to optimize, evaluate and manage resources and collect statistics for the satellite payload, gateways 530, and ground segments. The GRM system 562 may provide graphical user interfaces (GUI) for network plan files, reports, remote-access capabilities, self-test features, and security and access management, for example, to service provider GRM modules 570.

The modeling aspects of the GRM system 562 may further be utilized by the operator system 560 to optimize beam coefficients, cell layout, frequency reuse plans and terminal modulation and coding (modcod) for coverage and traffic requirement scenarios, for example, based on regulatory constraints, interference suppression, service quality and link analysis. The modeling aspects of the GRM system 562 further includes managing resources including a frequency spectrum, feeder link frequency to beam mapping, sub-band to beam mapping, power constraints, service quality and access control, for example, by joint optimization of beamforming beam plans and resource allocation. The GRM system 562 may store configuration files for configuring elements of the satellites (e.g., of the satellite groups 510) and gateways 520 including the infrastructures 530. In some aspects, the GRM system 562 store tables including beam plans and time plans for reconfiguring user-to-user, user-to-gateway, or gateway-to-user communications.

In some aspects, the GRM system 562 can manage system measurement including collecting information and computing statistics on payload resources, network resources, resource of a satellite base station subsystem (SBSS) module of the gateway infrastructures 530 and terminal resources available through the SBSS. The measurement aspects of the GRM system 562 may further include supporting performance and status monitoring of system resources, providing information used to develop scenarios for modeling, which can be fed into cognitive systems for enhanced operations.

In some aspects, the configuring aspects of the GRM system 562 includes system configuration management such as security and access management, loading and executing network plans, providing commands for the ESAs of the satellites of the satellite groups 510 and the SBSS and RFS modules of the gateway infrastructures 530.

Figure 6A:
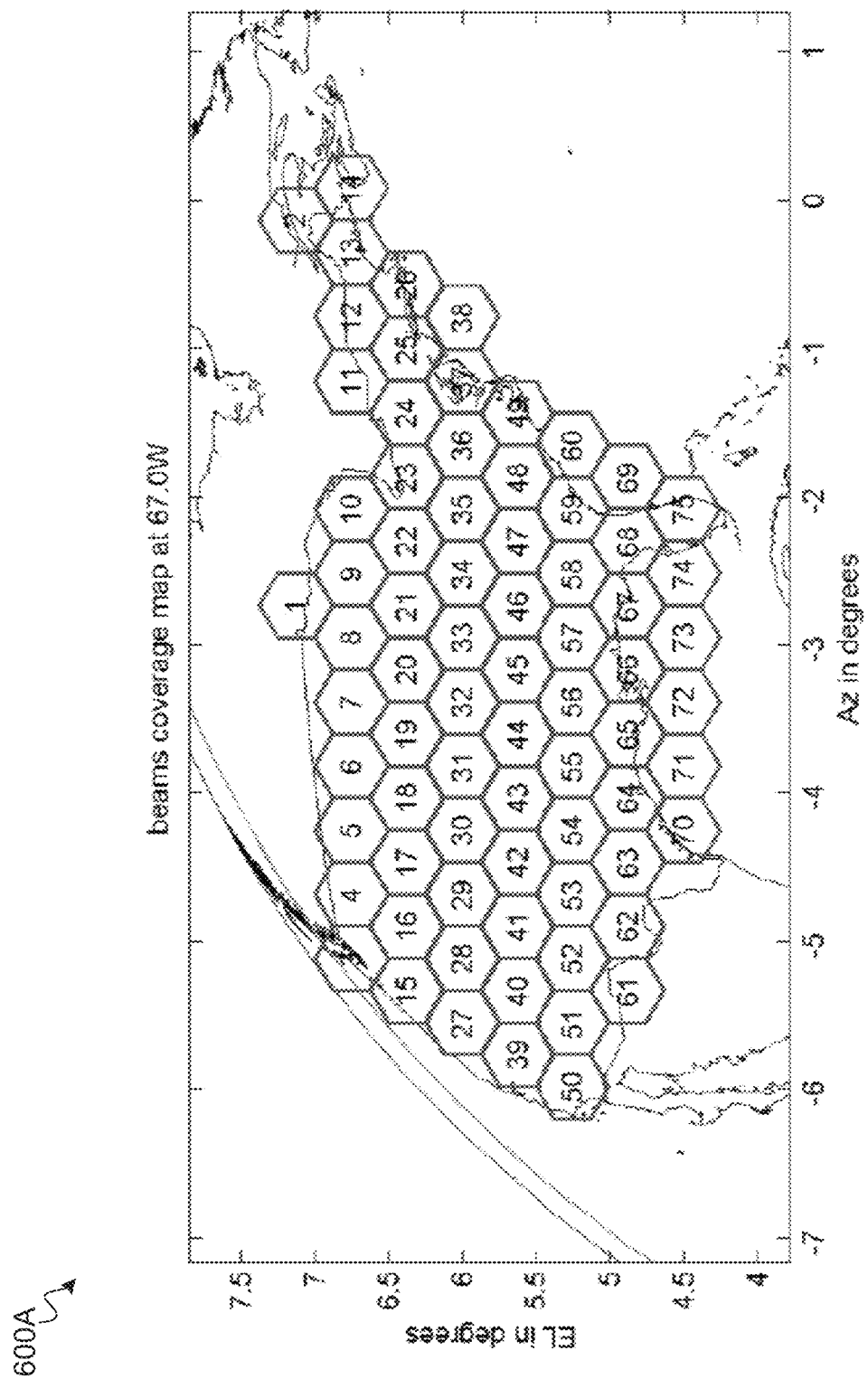
FIGS. 6A-6B are diagrams illustrating examples of a beam coverage map and a traffic distribution scenario of a satellite constellation system, according to certain aspects of the disclosure.
Figure 6B:
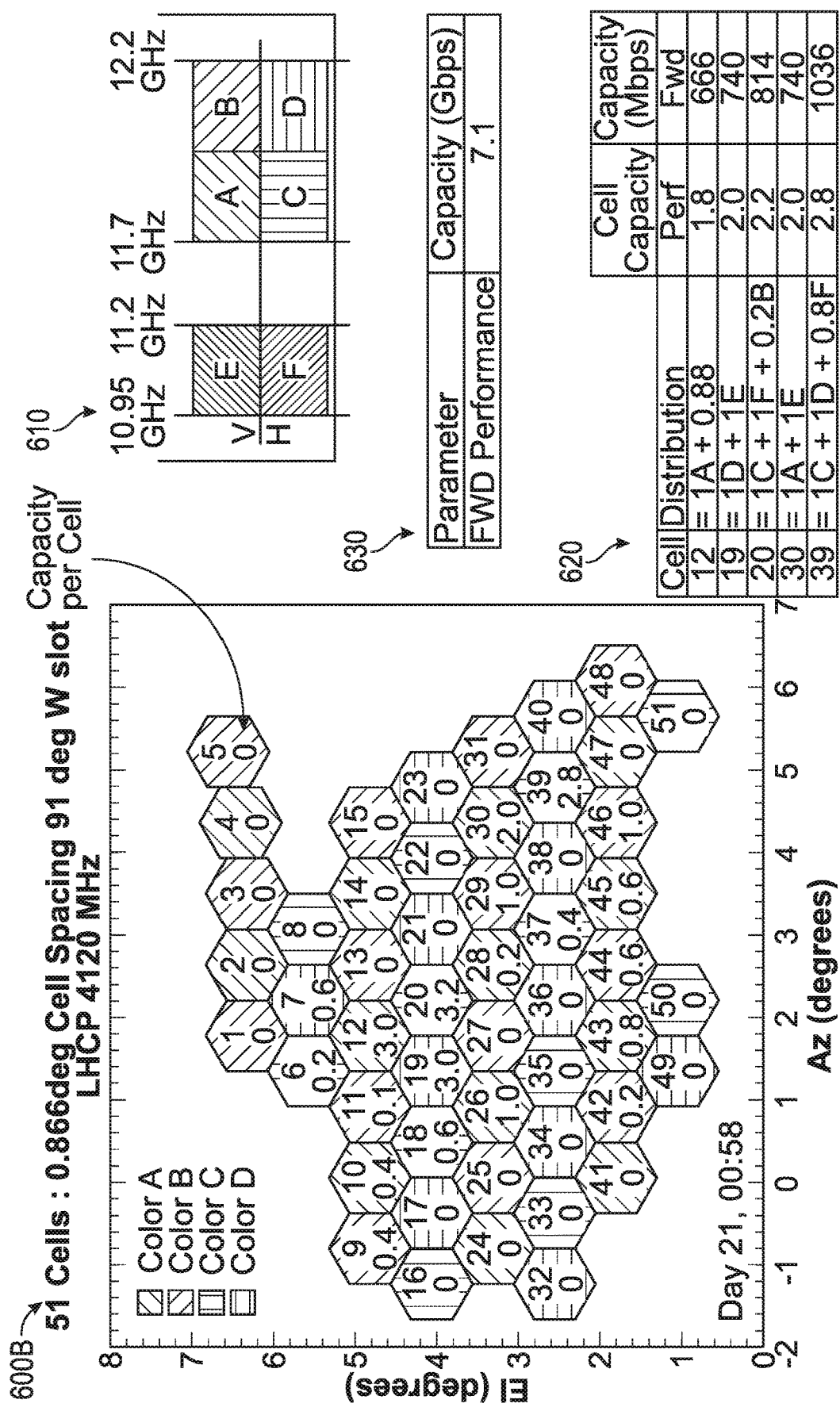

FIGS. 6A-6B are diagrams illustrating examples of a beam coverage map 600A and a traffic distribution scenario 600B of a satellite constellation system, according to certain aspects of the disclosure. The beam coverage map 600A is associated with an orbital slot at 67.0 degree west (67.0 W) including elevation angles within a range of about 4 to 7.5 degrees and azimuthal angles within a range of about −6.5 to +0.5 degrees. The beam coverage map 600A shows an example number of cells equal to 75 that can be supported by the subject technology.

The traffic distribution scenario 600B shows an example non-uniform distribution of capacity over 51 cells of an orbital slot at 91 degree west (91 W). The baseline configuration for the 51 cells are shown with fixed four-color (e.g., A, B, C and D) laydown and two-color overlay (e.g., E and F) as depicted in a user down-load frequency allocation table 610. In the user down-load frequency allocation table 610, colors A and B represent vertical polarization with 250 MHz channel bandwidth (BW) in a 11.7 to 12.2 GHz frequency band and colors C and D represent horizontal polarization with similar channel BW (e.g., 250 MHz channel BW in the 11.7 to 12.2 GHz frequency band). The overlay colors E and F, respectively, represent vertical and horizontal polarizations with a 250 MHz channel BW within a frequency band between 10.95 and 11.2 GHz. In the non-uniform traffic distribution scenario 600B, various cells are supported with different channel frequencies and polarizations, and a few cells (e.g., identified as 12, 19, 20, 30 and 39) are high-traffic cells, for which the cell capacity in MHz are shown in Table 620. For the high-traffic cells, the required capacity may be provided by steering and hoping beams. For example, for cell 19, of the forward capacity of 2, the delivered capacity is depicted to be 2.0, which is provided by one beam of color D and one beam of color E. Table 630 shows a summary of forward capacities in Gbps. For the example traffic distribution scenario 600B, approximately 7.1 Gbps of traffic is delivered.

Figure 7:
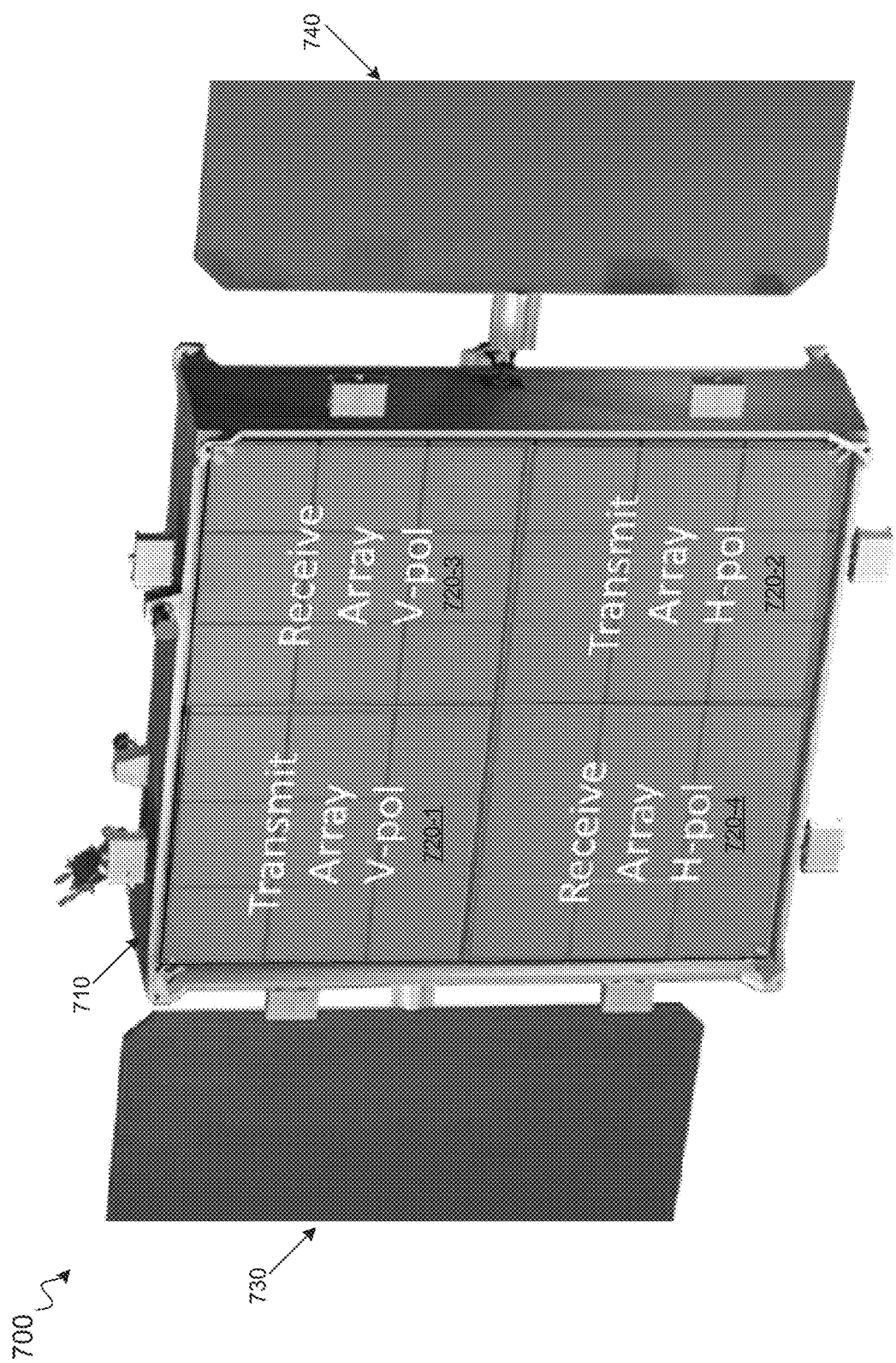
FIG. 7 is a conceptual diagram illustrating an example of a satellite node, according to certain aspects of the disclosure.

FIG. 7 is a conceptual diagram illustrating an example of a satellite node 700, according to certain aspects of the disclosure. The satellite node 700 can be a satellite of the flexible GEO satellite constellation system 500 of FIG. 5. The satellite node 700 has a modular structure and can include a number of electronic steering arrays (ESAs) 720 (e.g., 720-1 through 720-4) assembled in a bus 710. The bus 710 is coupled to solar power panels 730 and 740. The ESAs 720 can be TX and RX arrays with different polarities. For example, the ESAs 720-1, 72-2, 720-3 and 720-4 can be a vertically polarized (V-pol) TX array, a horizontally-polarized (H-pol) TX array, a V-pol RX array or and a H-pol RX array, respectively. Other configuration of the TX and RX arrays can be used, for example, the V-pol TX and RX arrays 720-1 and 720-3 can be configured into a single module and the H-pol TX and RX arrays 720-2 and 720-4 can be configured into in different module. Other configurations of the TX and RX arrays can be circularly polarized (Right Hand and/or Left Hand). The bus 710 can be square, circular or hexagonal shape and enclose ESAs which are respectively, square, circular or hexagonal shape. The bus 710 and the ESAs 720 are similar to the bus 310 and the ESA 320 of FIG. 3 described above. In some implementations, each TX array may include 24×24 antenna elements, although other numbers of antenna elements can also be used. Each antenna element can radiate an RF power within a range of about 300-3000 mW, although other ranges can also be used. The Ku-band TX arrays can transmit using a bandwidth within a range of about 10-13 GHz. Each Ku-band RX array may include 24×24 antenna elements, which are operable within a frequency range of about 12-15 GHz. Other configurations of the TX and RX arrays can cover additional frequency bands and ranges.

Figure 8:
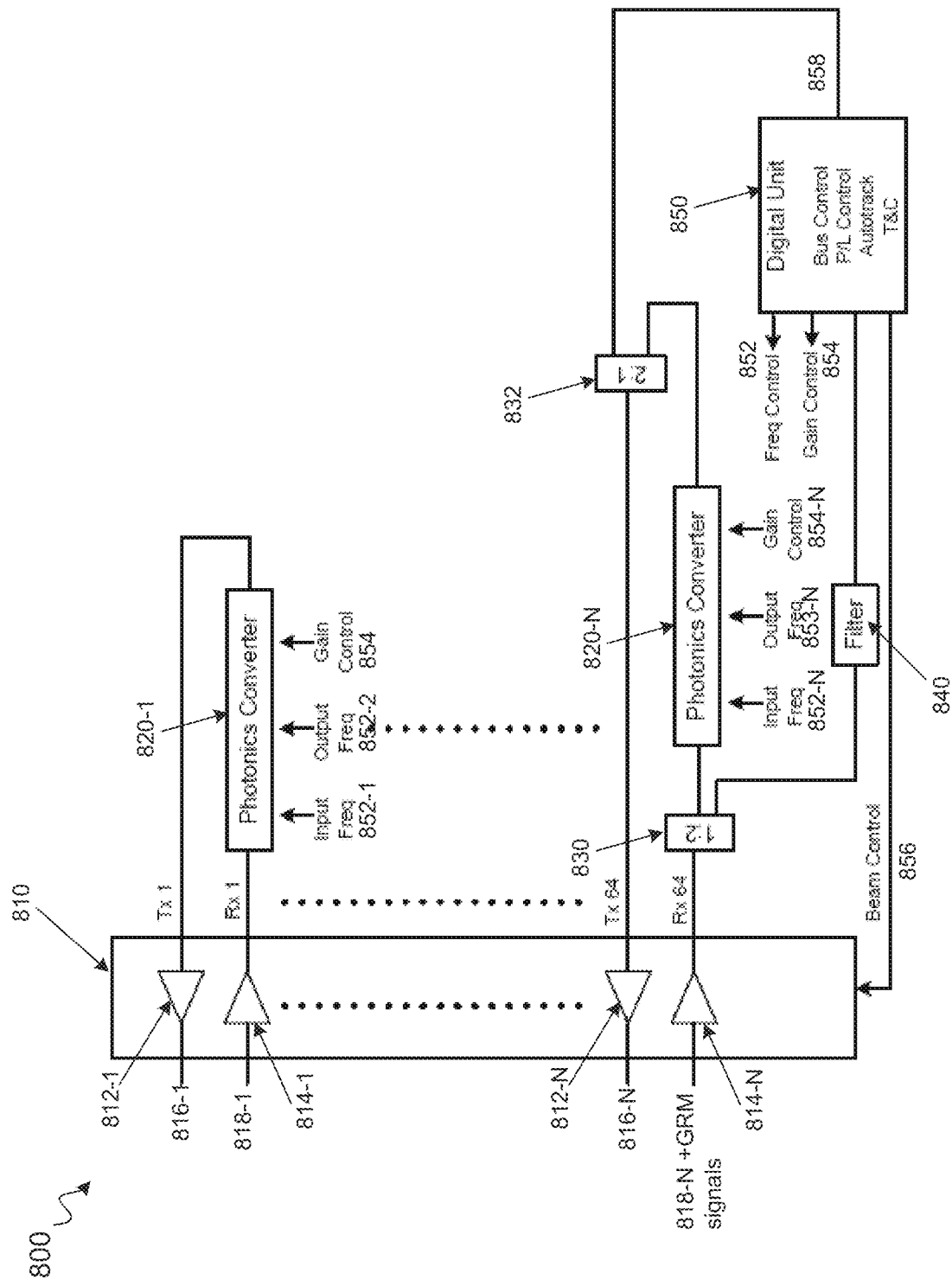
FIG. 8 is a block diagram illustrating an example of a payload architecture of a satellite node, according to certain aspects of the disclosure.

FIG. 8 is a block diagram illustrating an example of a payload architecture 800 of a satellite node, according to certain aspects of the disclosure. The payload architecture 800 includes an ESA 810, a number of frequency converters 820 (e.g., 820-1 through 820-N), a digital control unit 850, a demultiplexer 830, a multiplexer 832 and a filter 840. The ESA 810 may include, among other components, antenna arrays, gain stages 814 (e.g., 814-1 through 814-N), and beamforming and beam steering electronics for a number N of beams 818. The number of beams (N) can be, for example, 32, 64, 128 or any other number and is not limited to power of 2 (e.g., $2^k$, where k is an integer). In some aspects, the number N of beams is a configurable number that can be changed based on commands for the GRM system 562 shown in FIG. 5.

The frequency converters 820 can be implemented as photonic converters or radio-frequency (RF) converters. Photonic implementation can be a modular, scalable, flexible and low cost approach. The frequency converters 820 connect RX beams 818 (e.g., 818-1 through 818-N) with TX beams 816 to form a beam-pair, and are controlled by an input and output frequency control signals 852-1 and 852-2 and a gain control signal 854. One of the frequency converters 820, for example, the last one (e.g., 820-N) may receive, in addition to the RX beam 818-N, a GRM signal which is separated by the demultiplexer 830 and passed by the filter 840 to the digital control unit 850. The frequency converters 820 can support many satellite bands and may be tunable over very high frequency (VHF) to more than about 65 GHz. In some aspects, the photonic converter of the subject technology can be implemented with photonic components that are about 10 times smaller than corresponding RF components, and can result in and overall size, weight and power saving of about 65 percent. The frequency converters 820 can be agile photonic converters operable with a frequency range of about 1 GHz to 100 GHz, with selectable channel bandwidths. In some implementations, the photonic converter is an ultra-wide bandwidth frequency converter, and may include a tunable low phase noise local oscillator (LO), a modulator, high-isolation optical switch arrays and a number of photonic filters. The optical switch arrays are operable to allow a selection among a number of different operating-bandwidth photonic filters.

The control unit 850 receives GRM signals through the filter 840 and generates the frequency control signals 852 (e.g., the input and output frequency control signals 852-1 and 852-2), the gain control signal 854 and a beam control signal 856 based on the GRM signal. The beam control signal 856 is applied to the ESA 810 and used to configure the number (N) of RX and TX beams and control steering, shaping and other aspects of the TX and RX beams based on the demand. The control unit 850 may also generate telemetry signals 858, which are combined, via the multiplexer 832, with a TX beam (e.g., 816-N) and is transmitted to ground. The telemetry signal 858 may include information regarding health, the power levels, and on or off status of various components of the payload that are useful for the operator system 560 of FIG. 5.

Figure 9:
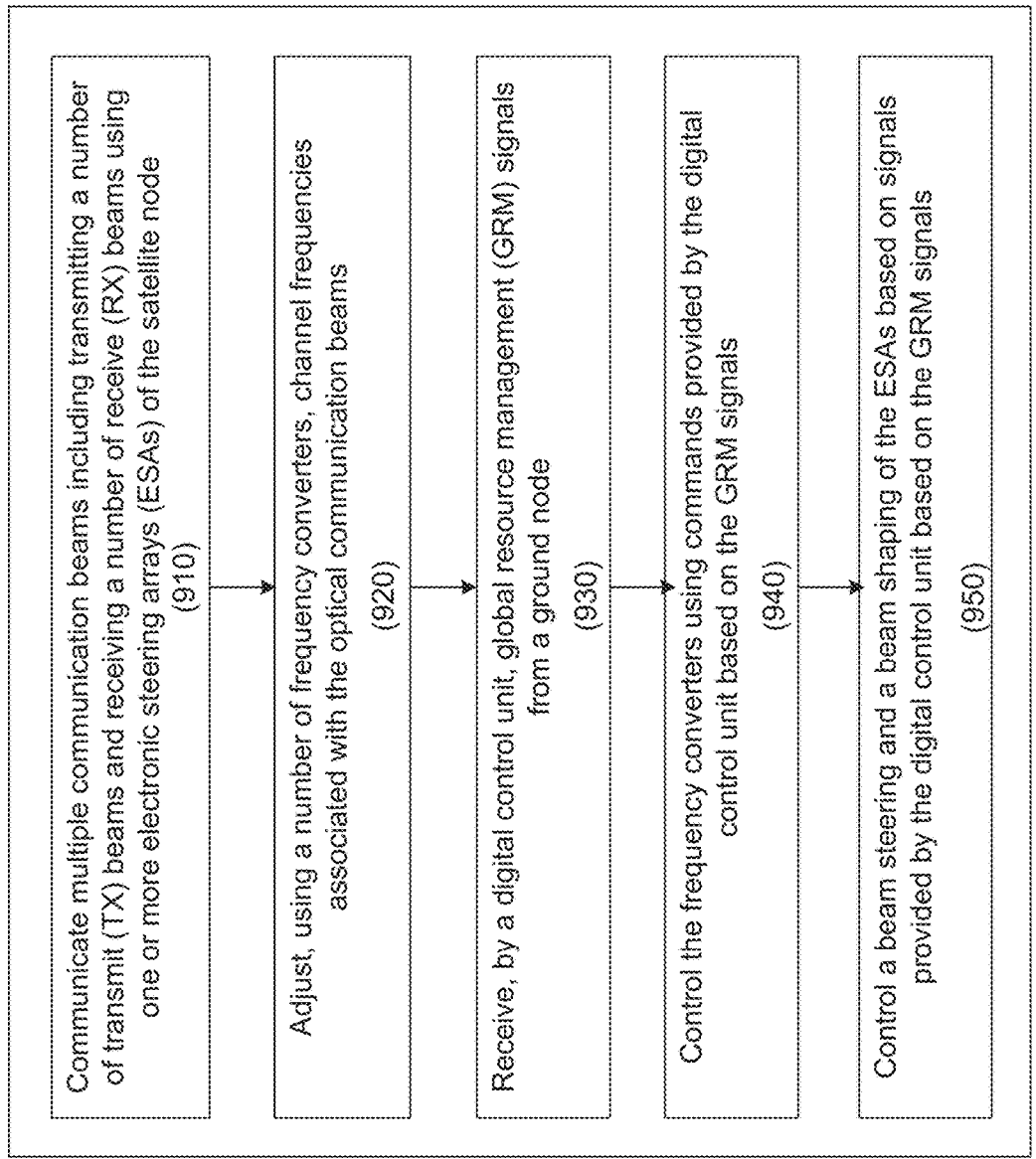
FIG. 9 is a flow diagram illustrating an example of a method of operating a satellite node, according to certain aspects of the disclosure.

FIG. 9 is a flow diagram illustrating an example of a method 900 of operating a satellite node (e.g., 300 of FIG. 3), according to certain aspects of the disclosure. The method 900 includes communicating multiple RF communication beams including transmitting a number of TX beams (e.g., 440-1 to 440-2 of FIG. 4A and 460-1 through 460-6 of FIG. 4B) and receiving a number of RX beams (e.g., 430-1 to 430-2 of FIG. 4A and 470-1 through 470-6 of FIG. 4B) using one or more ESAs (e.g., 320 of FIG. 3) of the satellite node (910). The method further includes adjusting using a number of frequency converters (e.g., 820 of FIG. 8) channel frequencies associated with the optical communication beams (920). Global resource management (GRM) (e.g., including 562 and 570-1 to 570-N of FIG. 5) signals may be received, by a digital control unit (e.g., 850 of FIG. 8), from a ground node (930). The frequency converters may be controlled by using commands (e.g., 852 and 854 of FIG. 8) provided by the digital control unit based on the GRM signals (940). A beam steering and a beam shaping of the ESAs may be performed based on signals (e.g., 856 of FIG. 8) provided by the digital control unit based on the GRM signals (950).

Figure 10:
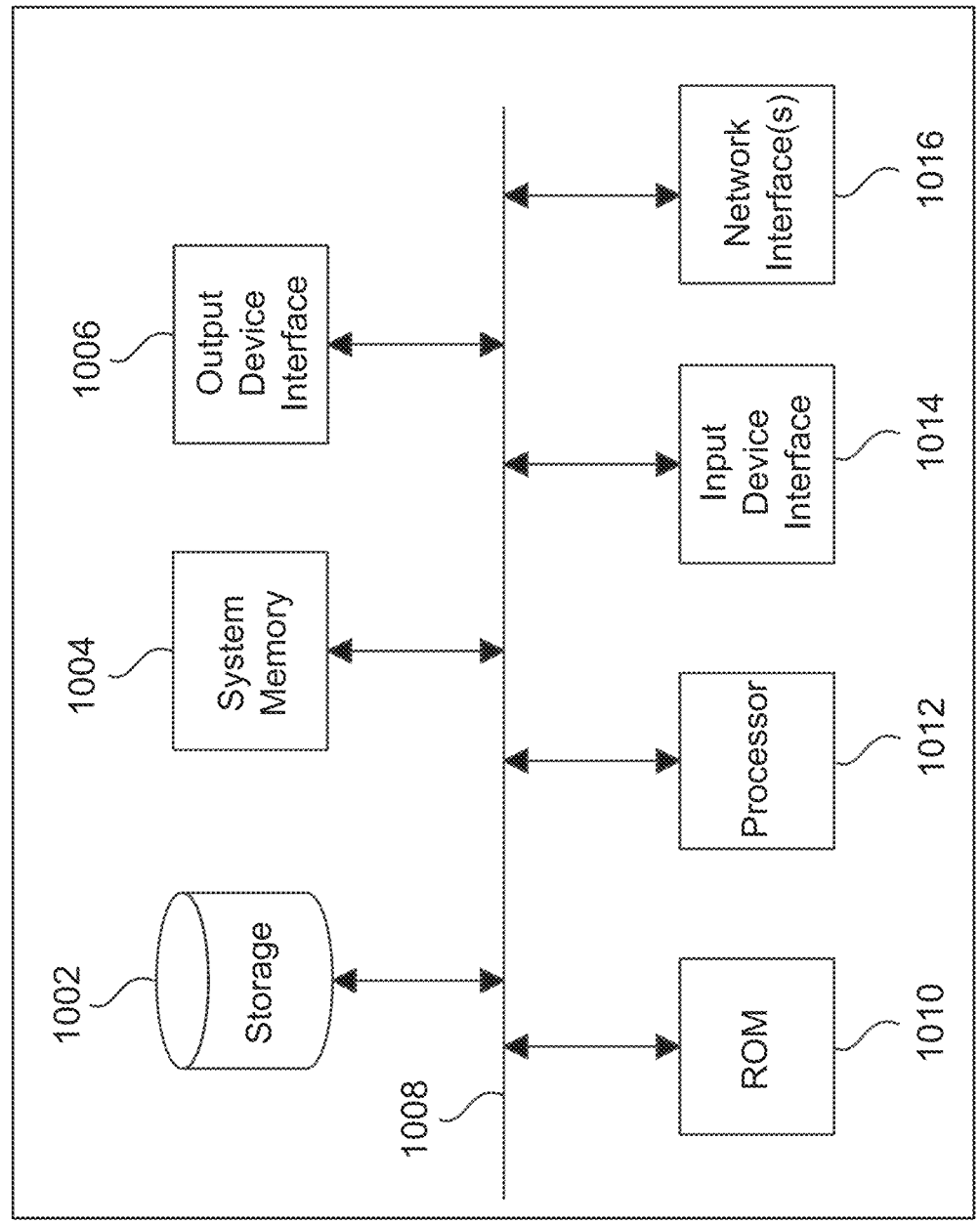
FIG. 10 is a block diagram conceptually illustrating an electronic system with which aspects of the subject technology are implemented.

FIG. 10 is a block diagram conceptually illustrating an electronic system 1000 with which aspects of the subject technology are implemented. The electronic system 1000, for example, can be a network device, a media converter, a desktop computer, a laptop computer, a tablet computer, a server, a switch, a router, a base station, a receiver, a phone, or generally any electronic device that transmits signals over a network. Such an electronic system 1000 includes various types of computer readable media and interfaces for various other types of computer readable media. In one or more implementations, the electronic system 1000 can be, and/or can be a part of the gateway infrastructure 130 of FIG. 1 or 530 of FIG. 5. The electronic system 1000 includes a bus 1008, one or more processing unit(s) 1012, a system memory 1004, a read-only memory (ROM) 1010, a permanent storage device 1002, an input device interface 1014, an output device interface 1006, and a network interface 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system. The permanent storage device 1002, on the other hand, is a read-and-write memory device. The permanent storage device 1002 is a non-volatile memory unit that stores instructions and data even when the electronic system 1000 is off One or more implementations of the subject disclosure use a mass storage device (such as a magnetic or optical disk and its corresponding disk drive) as the permanent storage device 1002. In some aspects, the GRM system 562 may be implemented by the processor processing unit(s) 1012 and may store various information, including tables including beam plans and time plans for reconfiguring user-to-user, user-to-gateway, or gateway-to-user communications, in ROM 1010 and/or the system memory 1004.

Other implementations use a removable storage device (such as a floppy disk, flash drive, and its corresponding disk drive) as the permanent storage device 1002. Like the permanent storage device 1002, the system memory 1004 is a read-and-write memory device. However, unlike the permanent storage device 1002, the system memory 1004 is a volatile read-and-write memory, such as random access memory. System memory 1004 stores any of the instructions and data that the one or more processing unit(s) 1012 needs at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input device interface 1014 and the output device interface 1006. The input device interface 1014 enables a user to communicate information and select commands to the electronic system. Input devices used with the input device interface 1014 include, for example, alphanumeric keyboards and pointing devices (also called "cursor control devices"). The output device interface 1006 enables, for example, the display of images generated by the electronic system 1000. Output devices used with the output device interface 1006 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks (not shown) through one or more network interfaces 1016. In this manner, the computer can be a part of one or more network of computers, such as a peer-to-peer network, a local area network ("LAN"), a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, eTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. An apparatus comprising: an electronic steering array (ESA) including a plurality of antenna elements; a plurality of frequency converters coupled to the ESA, each frequency converter of the plurality of frequency converters being configured to receive a gain control command and two frequency control commands; a digital control unit configured to provide the two frequency control commands and the gain control command to each frequency converter of the plurality of frequency converters; demultiplexer configured to direct a portion of an RX beam of one of independent payload paths through a filter to pass global resource management (GRM) signals to the digital control unit; and a multiplexer configured to add telemetry information received from the digital control unit to a TX beam of the one the independent payload paths, wherein: each frequency converter of the plurality of frequency converters is coupled to an antenna element of the ESA and forms an independent payload path, a payload path is configurable to support a communication beam-pair consisting of both a transmit (TX) beam and a receive (RX) beam, the communication beam-pair is configured according to a first time schedule to provide a forward communication path from a gateway to a user, a return communication path from the user to the gateway or a user to user communication path, and wherein the communication beam-pair is reconfigurable according to a second time schedule to provide a beam-hopping capability, and each frequency converter of the plurality of frequency converters is configured to couple the TX beam to the RX beam and to adjust a TX channel frequency, an RX channel frequency and a gain of a respective communication beam-pair independently using the frequency control commands and the gain control command.

2. The apparatus of claim 1, wherein the GRM signals includes information related to the frequency control commands and the gain control command, and ESA beam steering commands configured to enable independent control of optimized beam size, shape and direction of each RX and TX beam.

3. The apparatus of claim 1, wherein each frequency converter of the plurality of frequency converters comprises an ultra-wide bandwidth frequency converter including a tunable low phase noise local oscillator generator and high-isolation switch arrays operable to allow a selection among a number of different operating-bandwidth filters, wherein the ultra-wide bandwidth is within a range of 1 GHz to more than 100 GHz.

4. The apparatus of claim 1, wherein frequency control commands include input and output frequency commands that enable a frequency adjustment of RX and TX beams.

5. The apparatus of claim 1, wherein the digital control unit is further configured to provide beam control commands to the ESA, wherein the beam control commands are based on GRM signals.

6. The apparatus of claim 5, wherein the GRM signals further include optimized beamforming beam plans and time plans, and wherein the ESA is configured to employ the beam control commands to steer and shape the RX and TX beams according to the optimized beamforming beam plans and the time plans.

7. The apparatus of claim 6, wherein beam control commands further include bus control, payload control, autotrack and telemetry-and-command (T&C) signals.

8. The apparatus of claim 1, wherein each frequency converter of the plurality of frequency converters is one of a photonic frequency converter or a radio-frequency (RF) frequency converter.

9. A satellite system comprising: one or more satellite constellations configured to communicate with a plurality of ground communication cells via multiple transmit (TX) and receive (RX) beams; a plurality of frequency converters coupled to each satellite node of the one or more satellite constellations; a global resource management (GRM) system configured to provide GRM signals including information related to frequency and gain control commands; a demultiplexer configured to direct a portion of an RX beam of one of independent payload paths through a filter to pass the GRM signals to a digital control unit; and a multiplexer configured to add telemetry information received from the digital control unit to a TX beam of the one the independent payload paths, wherein each frequency converter of the plurality of frequency converters is configured to receive a gain control command and two frequency control commands provided by the digital control unit based on the GRM signals, wherein the plurality of frequency converters are configured to adjust gains and channel frequencies associated with the multiple TX and RX beams based on the frequency control commands and the gain control command, and wherein the multiple TX and RX beams are configured according to a first time schedule to provide a forward communication path from a gateway to a user, a return communication path from the user to the gateway or a user to user communication path, and wherein the multiple TX and RX beams are reconfigurable according to a second time schedule to provide a beam-hopping capability.

10. The satellite system of claim 9, wherein each satellite node comprises a modular structure including an electronic steering array (ESA) assembled on a bus, wherein the ESA includes a number of antenna elements and is assembled in one of a square, a circular or a hexagonal configuration.

11. The satellite system of claim 10, wherein satellite nodes of the one or more satellite constellations are configured to orbit in a number of different orbital slots of a geostationary orbit (GEO), and wherein a launch vehicle contains a flexible number of satellite nodes.

12. The satellite system of claim 9, wherein each frequency converter of the plurality of frequency converters comprises one of a photonic or a radio-frequency (RF) frequency converter, wherein the photonic or RF frequency converter is controlled based on the GRM signals.

13. The satellite system of claim 9, wherein the plurality of ground communication cells comprise gateways, and wherein each gateway includes a GRM module configured to manage system modeling, measuring and configuration, and wherein the GRM module is configured to store tables including beam plans and time plans for reconfiguring user-to-user, user-to-gateway, or gateway-to-user communications.

14. The satellite system of claim 13, wherein the GRM module is configured to manage system modeling including optimizing beam coefficients, cell layout, frequency reuse plans and terminal modulation and coding (modcod) for a coverage and traffic requirement scenario.

15. The satellite system of claim 13, wherein the GRM module is configured to manage system measurement including collecting information and computing statistics on payload resources, network resources, resource of a satellite base station subsystem (SBSS) and terminal resources available through the SBSS.

16. The satellite system of claim 15, wherein the GRM module is configured to manage system configuration including a security and access management, loading and executing network plans, providing commands for the one or more ESAs, the SBSS and a gateway radio frequency subsystem (RFS).

17. The satellite system of claim 13, wherein managing system modeling further includes managing resources including a frequency spectrum, a feeder link frequency to beam mapping, a sub-band to a beam mapping, power constraints, a service quality and an access control.

18. A method of operating a satellite node, the method comprising: communicating multiple communication beams including transmitting a plurality of transmit (TX) beams and receiving a plurality of receive (RX) beams using one or more electronic steering arrays (ESAs) of the satellite node; adjusting, using a plurality of frequency converters, channel frequencies associated with the multiple communication beams, each frequency converter of the plurality of frequency converters receiving a gain control command and two frequency control commands from a digital control unit; directing, by a demultiplexer, a portion of an RX beam of one of independent avoid paths through a filter to pass global resource management (GRM) signals received from a around node; adding, by a multiplexer, telemetry information received from the digital control unit to a TX beam of the one the independent payload paths; controlling the plurality of frequency converters using the frequency control commands and the gain control command provided by the digital control unit based on the GRM signals, wherein the multiple TX and RX beams are configured according to a first time schedule to provide a forward communication path from a gateway to a user, a return communication path from the user to the gateway or a user to user communication path, and wherein the multiple TX and RX beams are reconfigurable according to a second time schedule to provide a beam-hopping capability.

19. The method of claim 18, wherein communicating multiple communication beams comprises communicating a reconfigurable number of communication beams, wherein the reconfigurable number of communication beams is determined based on GRM signals.

20. The method of claim 18, wherein the method further comprises: controlling a beam steering and a beam shaping of the one or more ESAs based on signals provided by the digital control unit based on the GRM signals.

* * * * *